United States Patent
Hilprecht et al.

(10) Patent No.: US 11,501,172 B2
(45) Date of Patent: Nov. 15, 2022

(54) ACCURATELY IDENTIFYING MEMBERS OF TRAINING DATA IN VARIATIONAL AUTOENCODERS BY RECONSTRUCTION ERROR

(71) Applicant: SAP SE, Walldorf (DE)

(72) Inventors: Benjamin Hilprecht, Mannheim (DE); Daniel Bernau, Karlsruhe (DE); Martin Haerterich, Wiesloch (DE)

(73) Assignee: SAP SE, Walldorf (DE)

( * ) Notice: Subject to any disclaimer, the term of this patent is extended or adjusted under 35 U.S.C. 154(b) by 486 days.

(21) Appl. No.: 16/219,645

(22) Filed: Dec. 13, 2018

(65) Prior Publication Data
US 2020/0193298 A1 Jun. 18, 2020

(51) Int. Cl.
*G06N 3/08* (2006.01)
*G06N 3/04* (2006.01)
*G06N 20/00* (2019.01)
*G06F 17/18* (2006.01)

(52) U.S. Cl.
CPC ............. *G06N 3/088* (2013.01); *G06F 17/18* (2013.01); *G06N 3/0454* (2013.01); *G06N 3/0472* (2013.01); *G06N 20/00* (2019.01)

(58) Field of Classification Search
None
See application file for complete search history.

(56) References Cited

U.S. PATENT DOCUMENTS

| 10,909,419 | B2 * | 2/2021 | Itou ..................... G06F 11/0754 |
| 2017/0169357 | A1 * | 6/2017 | Caspi ....................... G06N 3/08 |
| 2017/0230675 | A1 * | 8/2017 | Wierstra .................. G06N 3/08 |

(Continued)

FOREIGN PATENT DOCUMENTS

JP     2018073258 A  *  5/2018

OTHER PUBLICATIONS

Generating Samples from Probability Distributions taken from https://web.mit.edu/urban_or_book/www/book/chapter7/7.1.3.html (Year: 2016).*

(Continued)

*Primary Examiner* — Alan Chen
(74) *Attorney, Agent, or Firm* — Mintz Levin Cohn Ferris Glovsky and Popeo, P.C.

(57) ABSTRACT

A system is described that can include a machine learning model and at least one programmable processor communicatively coupled to the machine learning model. The machine learning model can receive data, generate a continuous probability distribution associated with the data, sample a latent variable from the continuous probability distribution to generate a plurality of samples, and generate reconstructed data from the plurality of samples. The at least one programmable processor can compute a reconstruction error by determining a distance between the reconstructed data and the data, and generate, based on the reconstruction error, an indication representing whether a specific record within the received data was used to train the machine learning model. Related apparatuses, methods, techniques, non-transitory computer programmable products, non-transitory machine-readable medium, articles, and other systems are also within the scope of this disclosure.

15 Claims, 5 Drawing Sheets

(56) References Cited

U.S. PATENT DOCUMENTS

2018/0101770 A1* 4/2018 Tanaka ............... G06N 3/0472

OTHER PUBLICATIONS

Variational Autoencoders (Hui, Jonathan) taken from https://jhui.github.io/2017/03/06/Variational-autoencoders/ (Year: 2017).*

Guide to Autoencoders (Srinivasan, Kirhsnan) taken from https://yaledatascience.github.io/2016/10/29/autoencoders.html (Year: 2016).*

Abadi, M. et al., "Tensorflow: A system for large-scale machine learning," in Proc.of the 12th USENIX Conference on Operating Systems Design and Implementation (OSDI). Berkeley, CA, USA: USENIX Assoc., 2016, pp. 265-283.

Arora, S. et al., "Generalization and equilibrium in generative adversarial nets (gans)," in International Conference on Machine Learning, 2017, pp. 224-232.

Bowman, S. R. et al., "Generating sentences from a continuous space," arXiv preprint arXiv:1511.06349, 2015.

Dalal, N. et al., "Histograms of oriented gradients for human detection," in Proc. of the 2005 IEEE Conference on Computer Vision and Pattern Recognition (CVPR), vol. 1. Piscataway, NJ, USA: IEEE, 2005, pp. 886-893.

Donahue, C. et al., "Synthesizing audio with generative adversarial networks," arXiv preprint arXiv:1802.04208, 2018.

Ebrahimzadeh, R. et al., "Efficient handwritten digit recognition based on histogram of oriented gradients and svm," International Journal of Computer Applications, vol. 104, No. 9, 2014.

Fredrikson, M. et al., "Model inversion attacks that exploit confidence information and basic countermeasures," in Proc. of the 22nd ACM SIGSAC Conference on Computer and Communications Security (CCS). New York, NY, USA: ACM, 2015, pp. 1322-1333.

Goodfellow, I. et al., "Generative adversarial nets," in Proc. of Advances in Neural Information Processing Systems 27 (NIPS). NIPS Foundation, 2014, pp. 2672-2680.

The Guardian Online, "The guardian view on Googles NHS grab: legally inappropriate." [Online]. (2017). https://www.theguardian.com/commentisfree/2017/may/17/the-guardian-view-on-googles-nhs-grab-legally-inappropriate.

Hayes, J. et al., "Logan: Evaluating privacy leakage of generative models using generative adversarial networks," arXiv preprint arXiv:1705.07663, 2017.

Huang, L. et al., "Adversarial machine learning," in AISec, 2011.

Kingma, D. P. et al., "Auto-encoding variational bayes," arXiv preprint arXiv:1312.6114, 2013.

Krizhevsky, A. et al., and G. Hinton, "Learning multiple layers of features from tiny images," Technical Report, University of Toronto, 2009.

Lowe, D. G. "Object recognition from local scale-invariant features," in Computer vision, 1999. The proceedings of the seventh IEEE international conference on, vol. 2. Ieee, 1999, pp. 1150-1157.

Lucic, M. "Are gans created equal? a large-scale study," arXiv preprint arXiv:1711.10337, 2017.

Mozaffari-Kermani, M. et al., "Systematic poisoning attacks on and defenses for machine learning in healthcare," IEEE journal of biomedical and health informatics, vol. 19, No. 6, pp. 1893-1905, 2015.

Owen, A. B. "Monte Carlo theory, methods and examples," 2013.

Parzen, E. "On estimation of a probability density function and mode," The annals of mathematical statis-tics, vol. 33, No. 3, pp. 1065-1076, 1962.

Pedregosa, F. et al., "Scikit-learn: Machine learning in Python," Journal of Machine Learning Research, vol. 12, pp. 2825-2830, 2011.

Radford, A. et al., "Unsupervised representation learning with deep convolutional generative adversarial networks," arXiv preprint arXiv:1511.06434, 2015.

Shokri, R. et al., "Membership inference attacks against machine learning models," in Proc. of the 2017 IEEE Symposium on Security and Privacy (S&P). Piscataway, NJ, USA: IEEE, 2017, pp. 3-18.

Srivastava, N. et al., "Dropout: A simple way to prevent neural networks from overfitting," The Journal of Machine Learning Research, vol. 15, No. 1, pp. 1929-1958, 2014.

Theis, L. et al., "A note on the evaluation of generative models," in Proc. of the 4th International Conference on Learning Representations (ICLR), 2016. [Online]. Available: http://arXiv.org/abs/1511.01844.

Tramer, Ú. "Stealing machine learning models via prediction apis," in Proc. of the 2016 USENIX Security Symposium. Berkeley, CA, USA: USENIX Assoc., 2016, pp. 601-618.

Wu, Y. et al., "On the quantitative analysis of decoder-based gener-ative models," arXiv preprint arXiv:1611.04273, 2016.

Xiao, H. et al., "Fashion-MNIST: A novel image dataset for benchmarking machine learning algorithms," arXiv preprint arXiv:1708.07747, 2017.

Yang, C. et al., "Generative poisoning attack method against neural networks," arXiv preprint arXiv:1703.01340, 2017.

Yeom, S. et al., "The unintended consequences of overfitting: Training data inference attacks," arXiv preprint arXiv:1709.01604, 2017.

* cited by examiner

ACCURATELY IDENTIFYING MEMBERS OF TRAINING DATA IN VARIATIONAL AUTOENCODERS BY RECONSTRUCTION ERROR

TECHNICAL FIELD

The subject matter described herein relates to accurately identifying members of training data in variational autoencoders (VAEs) by reconstruction error.

BACKGROUND

Machine learning models can be used by computer processors to automatically learn (e.g., progressively improve performance on a specific task) from raw data. The learning can be unsupervised—i.e., the computer processors learn from training data that has not been labeled, classified or categorized. Unsupervised learning identifies commonalities in the data and reacts based on the presence or absence of such commonalities in each new piece of data. Autoencoders can be trained to perform unsupervised learning. An autoencoder is a type of generative neural network used to learn efficient data codings in an unsupervised manner. Conventionally, identification of members of training data population of an autoencoder has not been performed with high accuracy. There accordingly exists a need to identify members of training data population of an autoencoder with high accuracy.

SUMMARY

In one aspect, a system is described that can include a memory and at least one programmable processor communicatively coupled to the memory to access the machine learning model. The memory can store a data structure that includes a machine learning model. The machine learning model can receive data, generate a continuous probability distribution associated with the data, sample a latent variable from the continuous probability distribution to generate a plurality of samples, and generate reconstructed data from the plurality of samples. The at least one programmable processor can compute a reconstruction error by determining a distance between the reconstructed data and the data, and generate, based on the reconstruction error, an indication representing whether a specific record within the received data was used to train the encoder of the machine learning model.

In some variations one or more of the following features can optionally be included in any feasible combination. The data can include at least one of text and images. The machine learning model can include an encoder and a decoder. The encoder can perform the receiving of the data, and the generating of the continuous probability distribution. The decoder can perform the generating of the reconstructed data. The encoder can be a variational autoencoder. The encoder can be a first neural network. The decoder can be a second neural network. The machine learning model can further include a storage configured to store the plurality of samples prior to the generation of the reconstructed data.

The continuous probability distribution can be a Gaussian distribution represented as $N(E_\mu(x), E_\Sigma(x))$. The data can be represented as x. The mean of the continuous probability distribution can be represented as $E_\mu(x)$. The variance of the continuous probability distribution variance can be represented as $E_\Sigma(x)$. The latent variable is one of a plurality of latent variables. The decoder can minimize a distance measure between a distribution of the plurality of latent variables and the continuous probability distribution. The data can be represented as x. The latent variable can be represented as z. The reconstructed data can be represented as D(z). The distance between the reconstructed data and the data can be represented as $\|D(z)-(x)\|$. The reconstruction error can be represented as $$-\frac{1}{n}\sum_{i=1}^{i=n}(\|D(z)-(x)\|).$$

The distance measure can be a Kullback-Leibler divergence. The Kullback-Leibler divergence can be represented as $KL(N(E_\mu(x), E_\Sigma(x)))\|N(0,1)$.

The representation for the reconstruction error results in about 100% accurate prediction of whether the data has been used for training. The about 100% in accuracy is 98% or more in accuracy. The reconstruction error affects a quantification of a leakage of training data used to train the autoencoder.

Related apparatuses, methods, techniques, non-transitory computer programmable products, non-transitory machine-readable medium, articles, and other systems are also described and within the scope of this disclosure.

Implementations of the current subject matter can include, but are not limited to, methods consistent with the descriptions provided herein as well as articles that include a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to variational autoencoders (VAEs), it should be readily understood that such features are not intended to be limiting and can be extended to any database management system. The claims that follow this disclosure are intended to define the scope of the protected subject matter.

BRIEF DESCRIPTION OF DRAWINGS

Like reference numerals in the drawings indicate like elements.

DETAILED DESCRIPTION

Figure 1:
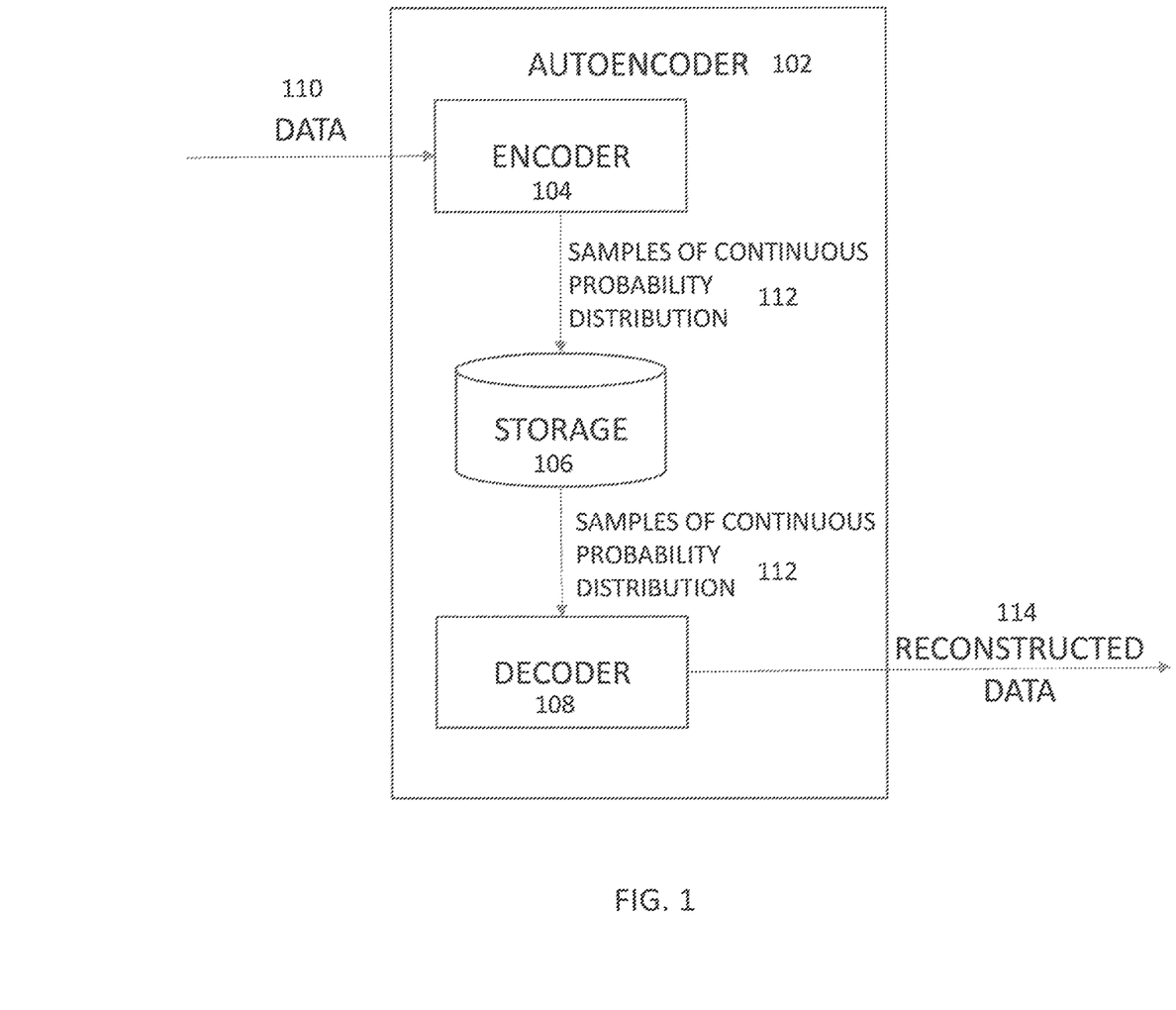
FIG. 1 illustrates a functionality of an autoencoder when data is received.

FIG. 1 illustrates an autoencoder 102 that receives data and generates reconstructed data, in accordance with methods described herein. In some implementations, the autoencoder 102 can include an encoder 104, a storage 106, and a decoder 108. The encoder 104 can receive data 110. The encoder 104 can subsequently generate a continuous probability distribution associated with the data 110. The continuous probability distribution can be a probability distribution that has a cumulative distribution function that is continuous, and such distribution can be generated by computing the cumulative distribution function for the data 110. The encoder 104 can sample a latent variable from the continuous probability distribution to generate samples 112. Samples 112 refer to discrete points of information within the continuous probability distribution. The storage 106 can store the samples 112. The storage of the samples 112 occupies less space than the data 110 would have occupied. The decoder 108 can retrieve the samples 112 from the storage 106 when required or desired, and can generate reconstructed data 114 by using the samples 112. The reconstructed data 114 can refer to a continuous-time data that can be generated by interpolating the samples 112.

In some implementations, the autoencoder 102 can be a variational autoencoder (VAE). Unlike other autoencoders, VAEs are generative autoencoders, meaning they can generate new instances that may look similar to original dataset used for training. The encoder 104 can be a first neural network. The decoder 108 can be a second neural network. The first neural network can be separate and different from the second neural network. The data 110 can include records. The data 110 can be at least one of text and images. Although text and images are described, in alternate implementations the data 110 can include any other type of data, such as audio, video, and/or the like. The data 110 can often be confidential and/or privileged.

The continuous probability distribution can be a Gaussian distribution, which can be represented as $N(E_\mu(x), E_\Sigma(x))$. Here, the data 110 is represented as x. A mean of the continuous probability distribution is represented as $E_\mu(x)$, and variance of the continuous probability distribution variance is represented as $E_\Sigma(x)$. The latent variable can be one of multiple latent variables. The decoder 108 can minimize the reconstruction error. The decoder 108 can further minimize a Kullback-Leibler divergence between a distribution of the latent variables and the continuous probability distribution.

Figure 2:
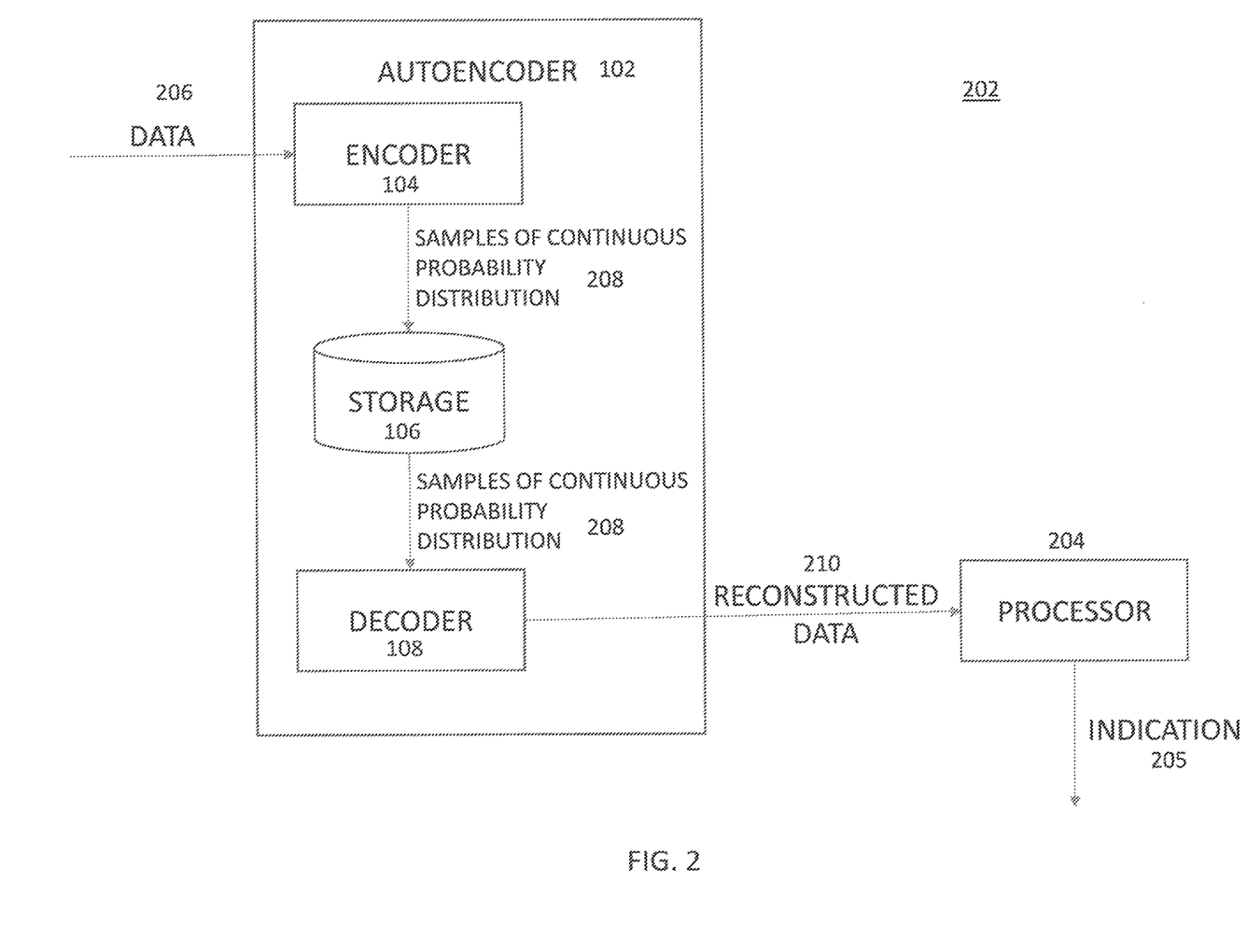
FIG. 2 illustrates a functionality of a system including the autoencoder and a processor to determine the confidence (e.g., likelihood or probability) with which data records are assumed to be present in the training data.

FIG. 2 illustrates a system 202 that includes the autoencoder 102 and a processor 204 to determine the confidence (e.g., likelihood or probability) with which data records are assumed to be present in the training data. The processor 204 can compute a reconstruction error by determining a value of a function associated with a distance (e.g., difference) between the reconstructed data and the data. The processor 204 can generate an indication 205 indicating (i.e., representing or characterizing) the confidence (e.g., likelihood or probability) with which data records are assumed to be present in the training data. The indication 205 can be an output on an input/output device, such as a graphical display, a sound, and/or other alerts. In some implementations, the indication 205 can be a record written to a database or other suitable data structure.

The encoder 104 can receive data 206. The encoder 104 can subsequently generate a continuous probability distribution associated with the data 206. The continuous probability distribution can be a probability distribution that has a cumulative distribution function that is continuous, and such distribution can be generated by computing the cumulative distribution function for the data 206. The encoder 104 can sample a latent variable from the continuous probability distribution to generate samples 208. The samples 208 can refer to discrete points of information within the continuous probability distribution. The storage 106 can store the samples 208. Storing the samples 208 rather than the data 206 can be technically beneficial as the samples 208 occupy less space in the storage 106 than the space the data 206 would have occupied. The decoder 108 can retrieve the samples 208 from the storage 106 when required or desired, and can generate reconstructed data 210. The processor 204 can generate, based on the reconstruction error, the indication 205, as described above.

The data 206 can include records, which can be at least one of text and images. Although text and images are described, in alternate implementations the data 206 can include any other type of data, such as audio, video, and/or the like. The data 110 can often be confidential and/or privileged, and accordingly may warrant special processing, which has not been performed traditionally.

The continuous probability distribution can be a Gaussian distribution, which can be represented as $N(E_\mu(x), E_\Sigma(x))$. Here, the data 206 is represented as x. Mean of the continuous probability distribution is represented as $E_\mu(x)$, and variance of the continuous probability distribution variance is represented as $E_\Sigma(x)$. The latent variable can be one of multiple latent variables. The decoder 108 can minimize a Kullback-Leibler divergence between a distribution of the latent variables and the continuous probability distribution.

The data 206 can be represented as x, the latent variable can be represented as z, the reconstructed data 210 can be represented as D(z), the distance (e.g., difference) between the reconstructed data 210 and the data 206 can be represented as $\|D(z)-(x)\|$, the reconstruction error can be represented as $$-\frac{1}{n}\sum_{i=1}^{i=n}(\|D(z)-(x)\|),$$

and the Kullback-Leibler divergence can be represented as $KL(N(E_\mu(x), E_\Sigma(x)))\|N(0,1))$. Such representation for the reconstruction error can advantageously ensure accuracy of determining a presence of specific records within the training data.

By representing the reconstruction error as $$-\frac{1}{n}\sum_{i=1}^{i=n}(\|D(z)-(x)\|),$$

an accurate or near-accurate prediction (i.e. 98-100%) of whether the data was used for training can be made for the datasets on which this work was evaluated when n has either a small value such as 300 or a large value such as $10^6$. The value of n achieving high accuracy can depend on (i.e., vary with) the dataset used for training. The value of the function can quantify a leakage (i.e., quantification of how much data from outside the training set is being used to train the VAE) of the autoencoder 102.

Figure 3:
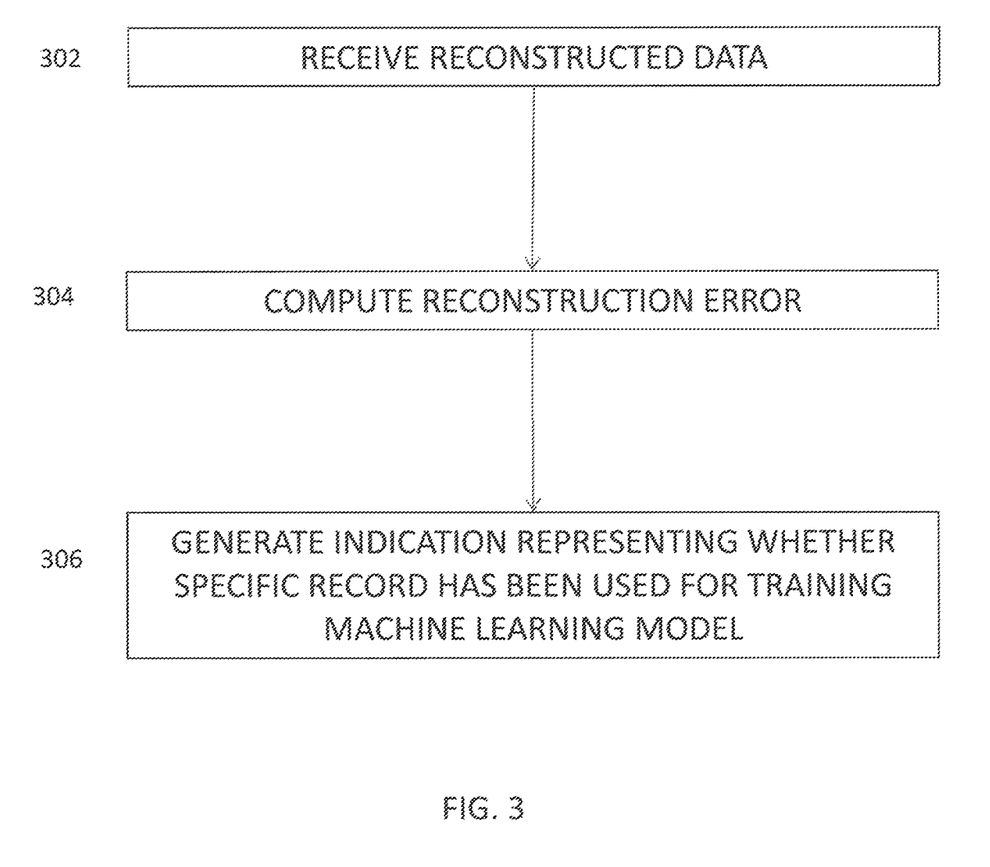
FIG. 3 illustrates a process implemented by the programmable processor.

FIG. 3 illustrates a process implemented by the programmable processor 204. The processor 204 can receive, at 302, reconstructed data 210. The processor 204 can compute, at 304, the reconstruction error by calculating $$-\frac{1}{n}\sum_{i=1}^{i=n}(\|D(z)-(x)\|).$$

The processor 204 can generate, at 306, an alert when the reconstruction error is more than a threshold, which may be preset.

Figure 4:
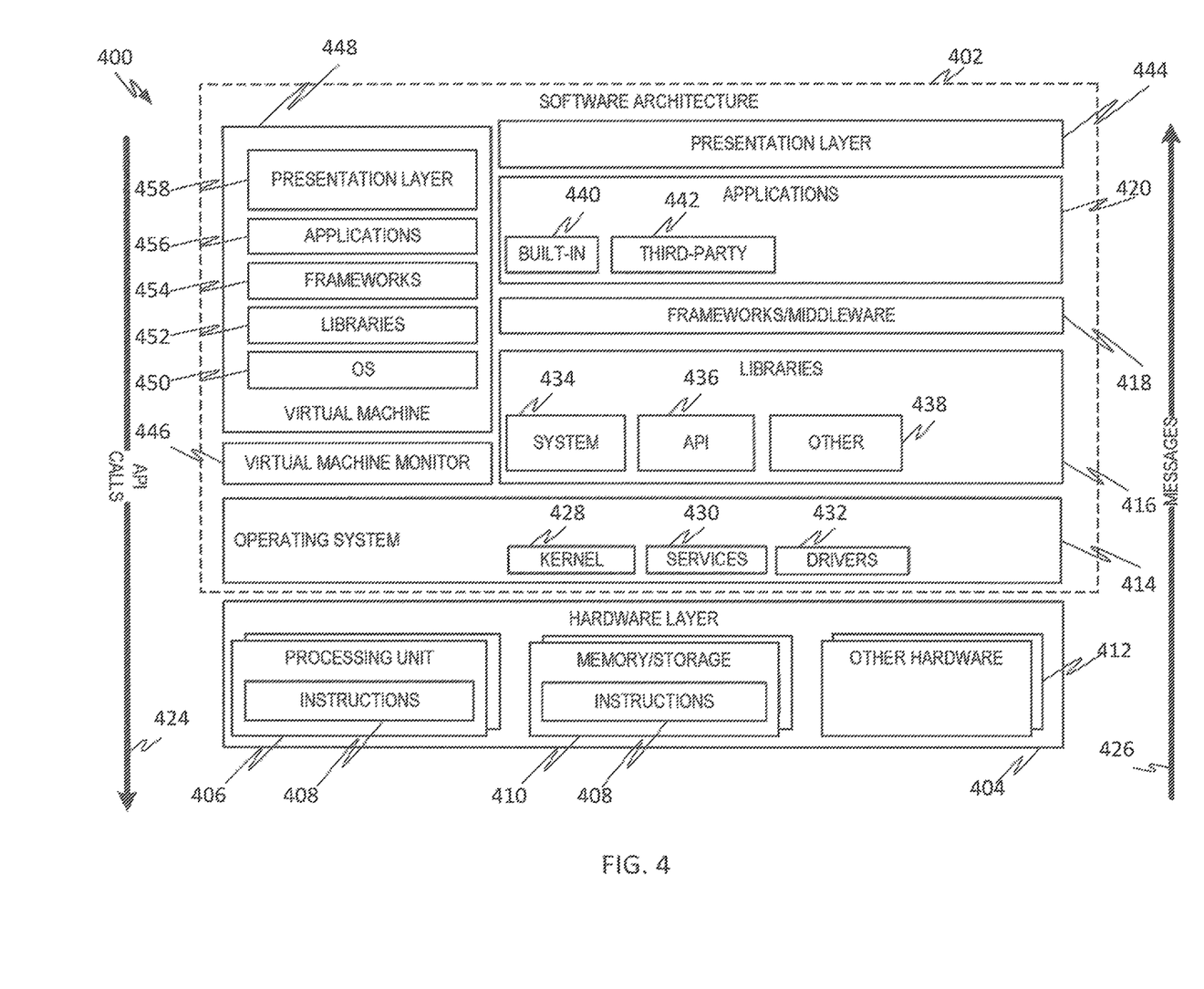
FIG. 4 illustrates a software architecture of computing device that implements the autoencoder.

FIG. 4 illustrates a software architecture 402 of a computing device 400 that implements the system 202. The architecture 402 is merely a non-limiting example of a software architecture and many other architectures can be implemented to facilitate the functionality described herein. A representative hardware layer 404 is illustrated and can represent, for example, any computing device, such as the computing device 400 that implements the system 202. In some examples, the hardware layer 404 can be implemented according to the architecture of the computer system 500 of FIG. 5 (described below).

The hardware layer 404 can include one or more processing units 406, memory/storage 410, and/or other hardware 412. The other hardware 412 can include, for example, the hardware illustrated as part of computer system 500 (described below). Each of the one or more processing units 406 and the memory/storage 410 can have associated executable instructions 408. The executable instructions can execute the methods, modules, subsystems, and components of the software architecture 402.

The software architecture 402 can be configured as a stack of layers where each layer provides particular functionality. For example, the software architecture 402 can include layers such as an operating system 414, libraries 416, frameworks/middleware 418, applications 420 and presentation layer 444. Operationally, the applications 420 and/or other components within the layers can invoke application programming interface (API) calls 424 through the software stack and access a response, returned values, and so forth illustrated as messages 426 in response to the API calls 424. The layers illustrated in FIG. 4 are representative in nature and not all software architectures have all layers. For example, some mobile or special purpose operating systems may not provide a frameworks/middleware layer 418, while others may provide such a layer. Other software architectures can include additional or different layers.

The operating system 414 can manage hardware resources and provide common services. The operating system 414 can include, for example, a kernel 428, services 430, and drivers 432. The kernel 428 can act as an abstraction layer between the hardware and the other software layers. For example, the kernel 428 can be responsible for memory management, processor management (e.g., scheduling), component management, networking, security settings, and so on. The services 430 can provide other common services for the other software layers. In some examples, the services 430 include an interrupt service. The interrupt service can detect the receipt of an interrupt and, in response, cause the architecture 402 to pause its current processing and execute an interrupt service routine (ISR) when an interrupt is accessed.

The drivers 432 can be responsible for controlling or interfacing with the underlying hardware. For instance, the drivers 432 can include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 416 can provide a common infrastructure that can be utilized by the applications 420 and/or other components and/or layers. The libraries 416 provide functionality that allows other software modules to perform tasks in an easier fashion than to interface directly with the underlying operating system 414 functionality (e.g., kernel 428, services 430 and/or drivers 432). The libraries 416 can include system libraries 434 (e.g., C standard library) that can provide functions such as memory allocation functions, string manipulation functions, mathematic functions, and the like. In addition, the libraries 416 can include API libraries 436 such as media libraries (e.g., libraries to support presentation and manipulation of various media format such as MPEG4, H.264, MP3, AAC, AMR, JPG, PNG), graphics libraries (e.g., an OpenGL framework that can be used to render 2D and 3D in a graphic content on a display), database libraries (e.g., SQLite that can provide various relational database functions), web libraries (e.g., WebKit that can provide web browsing functionality), and the like. The libraries 416 can also include a wide variety of other libraries 438 to provide many other APIs to the applications 420 and other software components/modules. In some examples, libraries 416 can provide one or more APIs serviced by a message oriented middleware.

The frameworks/middleware 418 can provide a higher-level common infrastructure that can be utilized by the applications 420 and/or other software components/modules. For example, the frameworks 418 can provide various graphic user interface (GUI) functions, high-level resource management, high-level location services, and so forth. The frameworks 418 can provide a broad spectrum of other APIs that can be utilized by the applications 420 and/or other software components/modules, some of which can be specific to a particular operating system or platform.

The applications 420 can include built-in applications 440 and/or third-party applications 442. Examples of representative built-in applications 440 can include, but are not limited to, a contacts application, a browser application, a book reader application, a location application, a media application, a messaging application, and/or a game application. Third-party applications 442 can include any of the built-in applications 440 as well as a broad assortment of other applications. In a specific example, the third-party application 442 (e.g., an application developed using the Android™ or iOS™ software development kit (SDK) by an entity other than the vendor of the particular platform) can be mobile software running on a mobile operating system such as iOS™ Android™, Windows® Phone, or other mobile computing device operating systems. In this example, the third-party application 442 can invoke the API calls 424 provided by the mobile operating system such as operating system 414 to facilitate functionality described herein.

The applications 420 can utilize built-in operating system functions (e.g., kernel 428, services 430 and/or drivers 432), libraries (e.g., system 434, APIs 436, and other libraries 438), frameworks/middleware 418 to create user interfaces to interact with users of the system. Alternatively, or additionally, in some systems interactions with a user can occur through a presentation layer, such as presentation layer 444. In these systems, the application/module "logic" can be separated from the aspects of the application/module that interact with a user.

In some implementations, the software architecture 402 can use one or more virtual machines 448. The virtual machine 448 can create a software environment where applications/modules can execute as if they were executing on a hardware computing device. The virtual machine 448 is hosted by a host operating system (operating system 414) and typically, although not always, has a virtual machine monitor 446, which manages the operation of the virtual machine 448 as well as the interface with the host operating system (i.e., operating system 414). The software architecture 402 can execute, within the virtual machine 448, an operating system 450, libraries 452, frameworks/middleware 454, applications 456 and/or presentation layer 458. These layers of software architecture 402 executing within the virtual machine 448 can be the same as corresponding layers previously described or can be different.

Certain implementations are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example implementations, one or more computer systems (e.g., a standalone, client, or server computer system) or one or more processors can be configured by software (e.g., an application or application portion) as a hardware-implemented module that operates to perform certain operations as described herein.

In various implementations, a hardware-implemented module can be implemented mechanically or electronically. For example, a hardware-implemented module can include dedicated circuitry or logic that is permanently configured (e.g., as a special-purpose processor, such as a field programmable gate array (FPGA) or an application-specific integrated circuit (ASIC)) to perform certain operations. A hardware-implemented module can also include programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering implementations in which hardware-implemented modules are temporarily configured (e.g., programmed), each of the hardware-implemented modules need not be configured or instantiated at any one instance in time. For example, where the hardware-implemented modules include a general-purpose processor configured using software, the general-purpose processor can be configured as respective different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple of such hardware-implemented modules exist contemporaneously, communications can be achieved through signal transmission (e.g., over appropriate circuits and buses that connect the hardware-implemented modules). In implementations in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation, and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example implementations, include processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but deployed across a number of machines. In some example implementations, the processor or processors can be located in a single location (e.g., within a home environment, an office environment, or a server farm), while in other implementations the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a communication network (e.g., the Internet) and via one or more appropriate interfaces (e.g., APIs).

Figure 5:
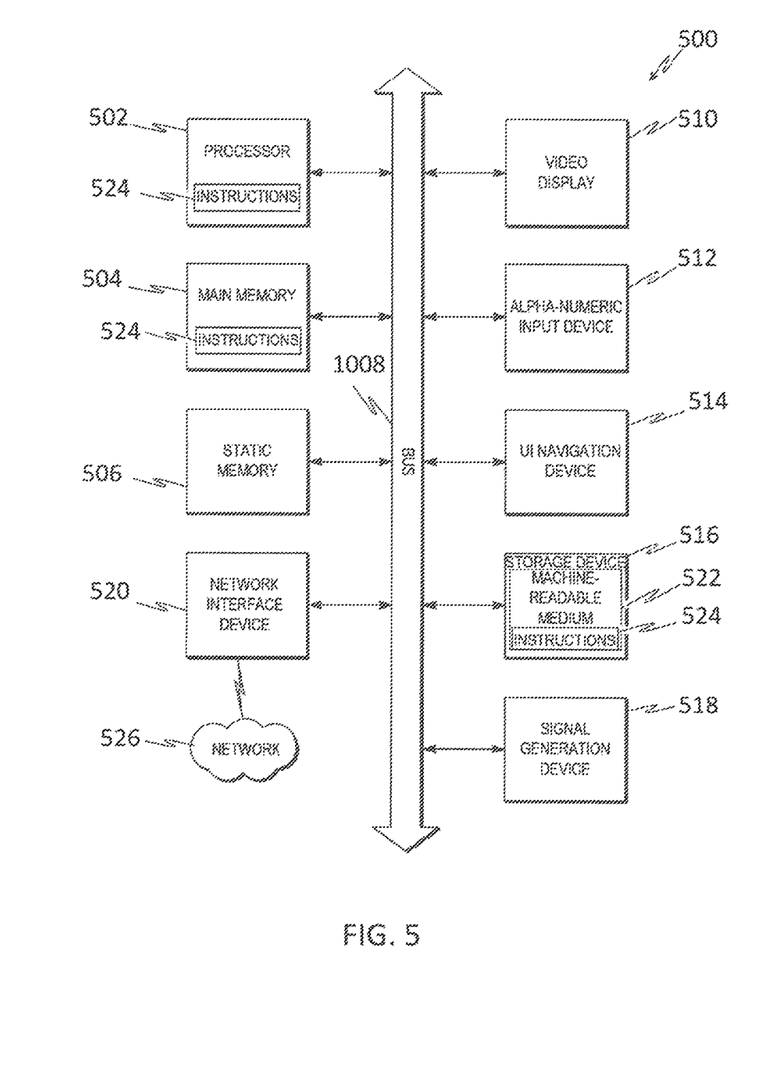
FIG. 5 illustrates a computer system that implements the autoencoder.

FIG. 5 illustrates a computer system 500 that implements, among other things, the system 202. The computer system 500 can execute instructions 524 that can cause the computer system 500 to perform any one or more of the methodologies discussed herein. In alternative implementations, the computer system 500 can operate as a standalone device or can be connected (e.g., networked) to other computer systems. In a networked deployment, the computer system 500 can operate in the capacity of a server or a client computer system in server-client network environment, or as a peer computer system in a peer-to-peer (or distributed) network environment. The computer system 500 can be a personal computer (PC), a tablet PC, a set-top box (STB), a personal digital assistant (PDA), a cellular telephone, a web appliance, a network router, switch, or bridge, or any computer system capable of executing instructions (sequential or otherwise) that specify actions to be taken by that computer system. Further, while only a single computer system is illustrated, the term "computer system" shall also be taken to include any collection of computer systems that individually or jointly execute a set (or multiple sets) of instructions to perform any one or more of the methodologies discussed herein.

The example computer system 500 includes a processor 502 (e.g., a central processing unit (CPU), a graphics processing unit (GPU), or both), a main memory 504, and a static memory 506, which communicate with each other via a bus 508. The computer system 500 can further include a video display unit 510 (e.g., a liquid crystal display (LCD) or a cathode ray tube (CRT)). The computer system 500 also includes an alphanumeric input device 512 (e.g., a keyboard or a touch-sensitive display screen), a user interface (UI) navigation (or cursor control) device 514 (e.g., a mouse), a disk drive device 516, a signal generation device 518 (e.g., a speaker), and a network interface device 520.

The disk drive device 516 includes a machine-readable medium 522 on which is stored one or more sets of data structures and instructions 524 (e.g., software) embodying or utilized by any one or more of the methodologies or functions described herein. The instructions 524 can also reside, completely or at least partially, within the main memory 504 and/or within the processor 502 during execution thereof by the computer system 500, with the main memory 504 and the processor 502 also constituting machine-readable media 522.

While the machine-readable medium 522 is shown in an exemplary implementation to be a single medium, the term "machine-readable medium" can include a single medium or multiple media (e.g., a centralized or distributed database, and/or associated caches and servers) that store the one or more instructions 524 or data structures. The term "machine-readable medium" shall also be taken to include any tangible medium that is capable of storing, encoding, or carrying instructions 524 for execution by the computer system 500 and that cause the computer system 500 to perform any one or more of the methodologies described herein, or that is capable of storing, encoding, or carrying data structures utilized by or associated with such instructions 524. The term "machine-readable medium" shall accordingly be taken to include, but not be limited to, solid-state memories, and optical and magnetic media. Specific examples of machine-readable media 522 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

The instructions 524 can further be transmitted or received over a communications network 526 using a transmission medium. The instructions 524 can be transmitted using the network interface device 520 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 524 for execution by the computer system, and includes digital or analog communications signals or other intangible media to facilitate communication of such software.

Although an implementation has been described with reference to specific exemplary implementations, it will be evident that various modifications and changes can be made to these implementations without departing from the broader spirit and scope of the disclosure. Accordingly, the specification and drawings are to be regarded in an illustrative rather than a restrictive sense. The accompanying drawings that form a part hereof show by way of illustration, and not of limitation, specific implementations in which the subject matter can be practiced. The implementations illustrated are described in sufficient detail to enable those skilled in the art to practice the teachings disclosed herein. Other implementations can be utilized and derived therefrom, such that structural and logical substitutions and changes can be made without departing from the scope of this disclosure. This Detailed Description, therefore, is not to be taken in a limiting sense, and the scope of various implementations is defined only by the appended claims, along with the full range of equivalents to which such claims are entitled.

Although specific implementations have been illustrated and described herein, it should be appreciated that any arrangement calculated to achieve the same purpose can be substituted for the specific implementations shown. This disclosure is intended to cover any and all adaptations or variations of various implementations. For instance, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Combinations of the above implementations, and other implementations not specifically described herein, will be apparent to those of skill in the art upon reviewing the above description.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on,"

above and in the claims is intended to mean, "based at least in part on," such that an unrecited feature or element is also permissible.

Although some implementations have been described in detail above, other modifications or additions are possible. Other implementations may be within the scope of the following claims.

What is claimed is:

1. A system comprising:
a memory storing a data structure that comprises a machine learning model, the machine learning model comprising a variational autoencoder using unsupervised learning, the variational autoencoder including a encoder and a decoder,
wherein the encoder is configured to:
receive data;
generate a continuous probability distribution associated with the data;
sample at least one latent variable from the continuous probability distribution to generate a plurality of samples; and
store the plurality of samples to enable retrieval by the decoder;
wherein the decoder is configured to:
retrieve the stored plurality of samples;
generate reconstructed data from the plurality of samples; and
at least one programmable processor communicatively coupled with the memory to access the machine learning model, the at least one programmable processor configured to:
compute a reconstruction error as a Kullback-Leibler divergence by at least determining a distance between probability distributions for the reconstructed data and the data; and
generate, in response to the reconstruction error exceeding a threshold, an indication indicating that a specific record within the received data was a data sample used to train the machine learning model comprising the variational autoencoder.

2. The system of claim 1, wherein the data comprises at least one of text and images.

3. The system of claim 1, wherein:
the encoder is a first neural network; and
the decoder is a second neural network.

4. The system of claim 1, wherein the machine learning model further comprises:
a storage configured to store the plurality of samples prior to the generation of the reconstructed data.

5. The system of claim 1, wherein:
the continuous probability distribution is a Gaussian distribution represented as $N(E_\mu(x), E_\Sigma(x))$;
wherein:
the data is represented as x;
mean of the continuous probability distribution is represented as $E_\mu(x)$; and
variance of the continuous probability distribution variance is represented as $E_\Sigma(x)$.

6. The system of claim 1, wherein:
the latent variable is one of a plurality of latent variables; and
the decoder minimizes a distance measure between a distribution of the reconstructed data of the plurality of latent variables and the continuous probability distribution.

7. The system of claim 6, wherein:
the data is represented as x;
the latent variables are represented as $z_i$ (i=1, n);
the reconstructed data is represented as $D(z_i)$;
the distance between the reconstructed data and the data is represented as $\|D(z_i)-(x)\|$;
the reconstruction error is represented as $$-\frac{1}{n}\sum_{i=1}^{i=n}(\|D(z_i)-(x)\|);$$

and
the distance measure is the Kullback-Leibler divergence, the Kullback-Leibler divergence being represented as $KL(N(E_\mu(x), E_\Sigma(x)))\|N(0,1)$.

8. The system of claim 7, wherein the representation for the reconstruction error results in about 100% accurate prediction of whether the data has been used for training.

9. The system of claim 8, wherein the about 100% in accuracy is 98% or more in accuracy.

10. The system of claim 1, wherein the reconstruction error affects a quantification of a leakage of training data used to train the autoencoder.

11. A method comprising:
receiving, by an encoder comprised in a variational autoencoder using unsupervised learning, a first plurality of records;
generating, by the encoder comprised in the variational autoencoder and using the first plurality of records, a continuous probability distribution associated with the first plurality of records;
sampling, by the encoder, at least one latent variable from the continuous probability distribution;
storing, by the encoder, the plurality of samples to enable retrieval by the decoder;
retrieving, by the decoder, the stored plurality of samples;
generating, by the decoder, reconstructed data based on the latent variable, the reconstructed data characterizing a reconstruction of the first plurality of records;
computing, by at least one processor operably coupled to the variational autoencoder, a reconstruction error as a Kullback-Leibler divergence by at least determining a value of a function associated with a distance between probability distributions the reconstructed data and the first plurality of records; and
generating, by the at least one processor, an indication in response to the reconstruction error exceeding a threshold, the indication indicating that a specific record of the first plurality of records was a data sample used for training the the variational autoencoder.

12. A non-transitory computer-readable medium storing instructions that, when executed by a computer, cause a system comprising a machine learning model and at least one programmable processor communicatively coupled to the machine learning model to perform operations comprising:
receiving, by an encoder comprised in a variational autoencoder using unsupervised learning, a first plurality of records;
generating, by the encoder comprised in the variational autoencoder and using the first plurality of records, a continuous probability distribution associated with the first plurality of records;

sampling, by the encoder, at least one latent variable from the continuous probability distribution;

storing, by the encoder, the plurality of samples to enable retrieval by the decoder;

retrieving, by the decoder, the stored plurality of samples;

generating, by the decoder, reconstructed data based on the latent variable, the reconstructed data characterizing a reconstruction of the first plurality of records;

computing, by at least one processor operably coupled to the variational autoencoder, a reconstruction error as a Kullback-Leibler divergence by at least determining a value of a function associated with a distance between probability distributions the reconstructed data and the first plurality of records; and generating, by the at least one processor, an indication in response to the reconstruction error exceeding a threshold, the indication indicating that a specific record of the first plurality of records was a data sample used for training the the variational autoencoder.

13. The non-transitory computer-readable medium of claim 12, wherein:
the encoder is a first neural network; and
the decoder is a second neural network.

14. The non-transitory computer-readable medium of claim 12, wherein:
the continuous probability distribution is a Gaussian distribution represented as $N(E_\mu(x), E_\Sigma(x))$;

wherein:
the data is represented as x;
mean of the continuous probability distribution is represented as $E_\mu(x)$; and
variance of the continuous probability distribution variance is represented as $E_\Sigma(x)$.

15. The non-transitory computer-readable medium of claim 12, wherein:
the latent variable is one of a plurality of latent variables;
the decoder minimizes a distance measure between a distribution of the plurality of latent variables and the continuous probability distribution;
the data is represented as x;
the latent variable is represented as $z_i$;
the reconstructed data is represented as $D(z_i)$;
the distance between the reconstructed data and the data is represented as $\|D(z_i)-(x)\|$;
the reconstruction error is represented as $$-\frac{1}{n}\sum_{i=1}^{i=n}(\|D(z_i)-(x)\|);$$

and
the distance measure is the Kullback-Leibler divergence, the Kullback-Leibler divergence being represented as $KL(N(E_\mu(x), E_\Sigma(x)))\|N(0,1)$.

* * * * *